United States Patent
Masuda et al.

(10) Patent No.: US 10,612,120 B2
(45) Date of Patent: Apr. 7, 2020

(54) THERMAL SPRAY SLURRY AND METHOD OF FORMING THERMAL SPRAYED COATING

(71) Applicant: FUJIMI INCORPORATED, Kiyosu-shi, Aichi (JP)

(72) Inventors: Takaya Masuda, Aichi (JP); Hiroyuki Ibe, Aichi (JP); Kazuya Sugimura, Aichi (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 0 days.

(21) Appl. No.: 15/923,221

(22) Filed: Mar. 16, 2018

(65) Prior Publication Data
US 2018/0274077 A1 Sep. 27, 2018

(30) Foreign Application Priority Data
Mar. 21, 2017 (JP) .................. 2017-054335

(51) Int. Cl.
| | | |
|---|---|---|
| *C23C 4/11* | (2016.01) | |
| *C23C 4/134* | (2016.01) | |
| *C23C 4/02* | (2006.01) | |
| *C09D 1/00* | (2006.01) | |
| *C01F 17/00* | (2020.01) | |

(52) U.S. Cl.
CPC ............ *C23C 4/11* (2016.01); *C01F 17/0043* (2013.01); *C09D 1/00* (2013.01); *C23C 4/02* (2013.01); *C23C 4/134* (2016.01); *C01P 2004/51* (2013.01); *C01P 2004/61* (2013.01)

(58) Field of Classification Search
CPC .... C23C 4/00; C23C 4/01; C23C 4/02; C23C 4/04; C23C 4/06; C23C 4/067; C23C 4/073; C23C 4/08; C23C 4/10; C23C 4/11; C23C 4/12; C23C 4/123; C23C 4/126; C23C 4/129; C23C 4/131; C23C 4/134; C23C 4/137; C23C 4/14; C23C 4/16; C23C 4/18; C23C 4/185
USPC ....... 427/446, 447, 448, 449, 450, 451, 452, 427/453, 454, 455, 456
See application file for complete search history.

(56) References Cited

U.S. PATENT DOCUMENTS

| | | | | |
|---|---|---|---|---|
| 2004/0146752 A1* | 7/2004 | Axen | ............ | A61L 27/32 428/702 |
| 2014/0178641 A1* | 6/2014 | Leblanc | ............ | C23C 4/18 428/143 |

FOREIGN PATENT DOCUMENTS

JP 2010-150617 A 7/2010

* cited by examiner

*Primary Examiner* — Dah-Wei D. Yuan
*Assistant Examiner* — Nga Leung V Law
(74) *Attorney, Agent, or Firm* — Foley & Lardner LLP

(57) ABSTRACT

To provide thermal spray slurry capable of forming a thermal sprayed coating having a high adhesion strength on a thermal spray target surface of a substrate, disclosed is thermal spray slurry for forming a thermal sprayed coating on the thermal spray target surface by spraying the thermal spray slurry on the thermal spray target surface of the substrate, the thermal spray slurry containing: thermal spray particles having a 50% particle diameter D50 equal to or larger than 1 μm and equal to or smaller than 5 μm in volume-based cumulative particle diameter distribution; and a dispersion medium in which the thermal spray particles are dispersed. In addition, a ratio D10/Ra between a surface roughness Ra (unit: μm) of the thermal spray target surface and a 10% particle diameter D10 (unit: μm) of the thermal spray particles in the volume-based cumulative particle diameter distribution satisfies a formula "0.4<D10/Ra≤0.9".

13 Claims, No Drawings

THERMAL SPRAY SLURRY AND METHOD OF FORMING THERMAL SPRAYED COATING

TECHNICAL FIELD

The present invention relates to thermal spray slurry and a method of forming a thermal sprayed coating.

BACKGROUND ART

A thermal spraying method is a technology of forming a coating on a substrate by injecting a thermal spray feedstock onto a substrate. Another thermal spraying method is also known in the art, in which slurry obtained by dispersing thermal spray particles into a dispersion medium is used as the thermal spray feedstock (for example, see PTL 1). In the thermal spraying method of the related art, it was conceived that an adhesion strength of the thermal sprayed coating onto a thermal spray target surface of the substrate increases if the thermal spray target surface of the substrate is relatively rough (that is, if a surface roughness Ra is high). However, when the thermal spray slurry is employed as the thermal spray feedstock, it may be difficult to obtain a sufficiently high adhesion strength in some cases even at a high roughness of the thermal spray target surface of the substrate.

CITATION LIST

Patent Literature

PTL 1: JP 2010-150617 A

SUMMARY OF INVENTION

Technical Problem

An object of the present invention is to provide thermal spray slurry capable of forming a thermal sprayed coating having a high adhesion strength onto a thermal spray target surface of a substrate, and a method of forming the thermal sprayed coating.

Solution to Problem

According to an aspect of the invention, there is provided thermal spray slurry for forming a thermal sprayed coating on a thermal spray target surface of a substrate by performing thermal spraying on the thermal spray target surface, the thermal spray slurry containing: thermal spray particles having a 50% particle diameter D50 equal to or larger than 1 μm and equal to or smaller than 5 μm in volume-based cumulative particle diameter distribution; and a dispersion medium in which the thermal spray particles are dispersed, wherein a ratio D10/Ra between a surface roughness Ra (unit: μm) of the thermal spray target surface and a 10% particle diameter D10 (unit: μm) of the thermal spray particles in the volume-based cumulative particle diameter distribution satisfies a formula "$0.4 < D10/Ra \leq 0.9$".

According to another aspect of the invention, there is provided a method of forming a thermal sprayed coating on a thermal spray target surface of a substrate by spraying, onto the thermal spray target surface, thermal spray slurry containing thermal spray particles and a dispersion medium in which the thermal spray particles are dispersed, wherein a 50% particle diameter D50 of the thermal spray particles in volume-based cumulative particle diameter distribution is equal to or larger than 1 μm and equal to or smaller than 5 μm, and a ratio D10/Ra between a surface roughness Ra (unit: μm) of the thermal spray target surface and a 10% particle diameter D10 (unit: μm) of the thermal spray particles in the volume-based cumulative particle diameter distribution satisfies a formula "$0.4 < D10/Ra \leq 0.9$".

Advantageous Effects of Invention

According to the present invention, it is possible to form a thermal sprayed coating having a high adhesion strength onto a thermal spray target surface of a substrate.

DESCRIPTION OF EMBODIMENTS

An embodiment of the invention will now be described in details. Note that the following embodiments are merely for illustrative purposes, and are not intended to limit the scope of the invention. Various changes or modifications may be possible in the embodiments described below, and they are also construed as being incorporated in the scope of the invention.

The inventors made diligent studies and found that, in a thermal spraying method in which thermal spray slurry is employed as a thermal spray feedstock, an adhesion strength of a thermal sprayed coating to the thermal spray target surface of the substrate tends to increase when the thermal spray target surface of the substrate is not relatively rough. In particular, the inventors also found that the adhesion strength of the thermal sprayed coating to the thermal spray target surface of the substrate is strong when a specific relationship is established between a surface roughness Ra of the thermal spray target surface of the substrate and a 10% particle diameter D10 in volume-based cumulative particle diameter distribution of the thermal spray particles.

That is, using the thermal spray slurry according to this embodiment, a thermal sprayed coating is formed on the thermal spray target surface by performing thermal spraying on the thermal spray target surface of the substrate. The thermal spray slurry contains thermal spray particles having a 50% particle diameter D50 equal to or larger than 1 μm and equal to or smaller than 5 μm in the volume-based cumulative particle diameter distribution, and a dispersion medium in which the thermal spray particles are dispersed. In addition, a ratio D10/Ra between the surface roughness Ra (unit: μm) of the thermal spray target surface and the 10% particle diameter D10 (unit: μm) in the volume-based cumulative particle diameter distribution of the thermal spray particles satisfies a formula "$0.4 < D10/Ra \leq 0.9$".

When the thermal spraying is performed using the thermal spray slurry having such a configuration, it is possible to form a thermal sprayed coating having a high adhesion strength to the thermal spray target surface of the substrate.

Note that the diameters D10 and D50 refer to particle diameters whose cumulative frequencies in a small particle side of the volume-based cumulative particle diameter distribution are 10% and 50%, respectively. The particle diameters D10 and D50 may be measured, for example, using a laser diffraction/scattering type particle diameter distribution measurement device.

Thermal spray slurry and a method of forming a thermal sprayed coating using the thermal spray slurry according to this embodiment will now be described in details.

The thermal spray slurry according to this embodiment contains thermal spray particles and a dispersion medium in which the thermal spray particles are dispersed. The thermal spray slurry can be produced by mixing the thermal spray particles and the dispersion medium and dispersing the thermal spray particles in the dispersion medium.

The type of the thermal spray particles may include, but not particularly limited to, particles of metal oxide (ceramics), metal, resin, cermet, or the like.

The type of the metal oxide may include, but not particularly limited to, for example, yttrium oxide ($Y_2O_3$), aluminum oxide ($Al_2O_3$), silicon oxide ($SiO_2$), titanium oxide ($TiO_2$), or zirconium oxide ($ZrO_2$).

For the particle diameter of the thermal spray particles, it is necessary to set the 50% particle diameter D50 in the volume-based cumulative particle diameter distribution to 1 μm or larger and 5 μm or smaller, preferably 2 μm or larger and 4 μm or smaller, and more preferably 2 μm or larger and 3 μm or smaller.

The 10% particle diameter D10 in the volume-based cumulative particle diameter distribution necessarily satisfies a predetermined relationship with the surface roughness Ra of the thermal spray target surface of the substrate. That is, a ratio D10/Ra between the surface roughness Ra (unit: μm) of the thermal spray target surface and the 10% particle diameter D10 (unit: μm) in the volume-based cumulative particle diameter distribution of the thermal spray particles necessarily satisfies the aforementioned formula and is set to be larger than 0.4 and equal to or smaller than 0.9, and preferably be equal to or larger than 0.45 and equal to or smaller than 0.7.

When the thermal spraying is performed using the thermal spray slurry having such a configuration, it is possible to forma thermal sprayed coating having a high adhesion strength to the thermal spray target surface of the substrate.

A concentration of the thermal spray particles in the thermal spray slurry according to this embodiment may be set to, but not particularly limited to, for example, 5 mass % or higher and 50 mass % or lower, and more preferably 30 mass % or higher and 50 mass % or lower. If the concentration of the thermal spray particles is equal to or higher than 30 mass %, a thickness of the thermal sprayed coating produced from the thermal spray slurry per unit time easily increases excessively.

The type of the dispersion medium may include, but not particularly limited to, for example, water, an organic solvent, or a mixed solvent obtained by mixing two or more types of these solvents. The organic solvent may include, for example, alcohols such as methanol, ethanol, n-propyl alcohol, and isopropyl alcohol.

The thermal spray slurry according to this embodiment may further contain components other than the thermal spray particles and the dispersion medium as desired. For example, in order to improve performance of the thermal spray slurry, an additive may be further contained as necessary. The additive may include, for example, a dispersant, a viscosity adjusting agent, a coagulant, a re-dispersibility improver, an antifoaming agent, an antifreezing agent, an antiseptic agent, and a fungicide. The dispersant has a property of improving dispersion stability of the thermal spray particles in the dispersion medium, and includes a polymer type dispersant such as polyvinyl alcohol and a surfactant type dispersant. Such an additive may be used solely, or two or more of them may be used in combination.

A material of the substrate may include, but not particularly limited to, for example, metal (such as aluminum), resin, or ceramics. The surface roughness Ra of the thermal spray target surface of the substrate is preferably set to 1.1 μm or smaller. In this configuration, it is possible to more improve a thermal spraying rate (coating formation rate).

Shot blasting may also be performed on the thermal spray target surface before the thermal spraying of the thermal spray slurry on the thermal spray target surface. When the thermal spray slurry is sprayed after the shot blasting, it is possible to perform thermal spraying on the thermal spray target surface having a surface roughness Ra adjusted to a desired value through shot blasting.

EXAMPLES

Examples and comparative examples will now be described to more specifically explain the present invention.

Ten types of thermal spray slurry were produced by mixing and dispersing yttrium oxide particles as the thermal spray particles into water as the dispersion medium. Ten types of thermal spray slurry were produced by using any one of the ten types having different 10% particle diameters D10 and 50% particle diameters D50 in the volume-based cumulative particle diameter distribution as the yttrium oxide particles.

All of the ten types of thermal spray slurry have an yttrium oxide particle concentration of 30 mass %. In addition, the 10% particle diameter D10 and the 50% particle diameter D50 of the yttrium oxide particles are shown in Table 1. The volume-based cumulative particle diameter distribution of the yttrium oxide particles was measured using a laser diffraction/scattering type particle size distribution measurement device, Model No. LA-300, produced by Horiba, Ltd.

TABLE 1

|  | Example 1 | Example 2 | Example 3 | Example 4 | Example 5 |
|---|---|---|---|---|---|
| D10 (μm) of thermal spray particles | 0.47 | 0.75 | 0.89 | 0.89 | 1.01 |
| D50 (μm) of thermal spray particles | 1.8 | 2.5 | 2.6 | 2.6 | 3.3 |
| Surface roughness Ra (μm) of thermal spray target surface | 1.1 | 1.6 | 1.6 | 1.1 | 1.6 |
| D10/Ra | 0.43 | 0.47 | 0.56 | 0.81 | 0.63 |
| Adhesion strength (N) | 345 | 422 | 432 | 277 | 408 |
| Thermal spraying rate (μm/pass) | 0 | 2.3 | 2.5 | 3.1 | 2.2 |
| Surface roughness Ra (μm) of thermal sprayed coat | 1 | 1 | 1 | 1 | 1.1 |

|  | Example 6 | Comparative Example 1 | Comparative Example 2 | Comparative Example 3 | Comparative Example 4 |
|---|---|---|---|---|---|

TABLE 1-continued

| | | | | | |
|---|---|---|---|---|---|
| D10 (μm) of thermal spray particles | 1.10 | 0.89 | 0.47 | 0.47 | 1.10 |
| D50 (μm) of thermal spray particles | 4.1 | 2.6 | 1.8 | 1.8 | 4.1 |
| Surface roughness Ra (μm) of thermal spray target surface | 2.7 | 2.7 | 2.7 | 1.6 | 1.1 |
| D10/Ra | 0.41 | 0.33 | 0.17 | 0.29 | 1.00 |
| Adhesion strength (N) | 328 | 213 | 208 | 226 | 230 |
| Thermal spraying rate (μm/pass) | 1.7 | 1.6 | 1.5 | 2.5 | |
| Surface roughness Ra (μm) of thermal sprayed coat | 1.3 | 1.3 | 1.3 | 1.2 | 1.1 |

Then, various plate-shaped substrates having different surface roughnesses Ra on plate surfaces corresponding to the thermal spray target surfaces were prepared. The surface roughness Ra of the thermal spray target surface was adjusted by performing shot blasting as necessary. The surface roughness Ra of the thermal spray target surface is shown in Table 1. In addition, the substrate is formed of aluminum.

Here, a method of measuring the surface roughness (arithmetic mean roughness) Ra of the thermal spray target surface will be described. The surface roughness Ra of the thermal spray target surface was measured in accordance with the method prescribed in JIS B0601. Using a surface roughness meter, Model No. SV-3000S CNC, produced by Mitutoyo Corporation, the surface roughness Ra was measured at arbitrary five points on the plate surface corresponding to the thermal spray target surface, and an average of the surface roughnesses Ra of the measured five points was set as the surface roughness Ra of that thermal spray target surface. A reference line length and a cut-off value were set to 0.8 mm, respectively.

A thermal sprayed coating was formed on the thermal spray target surface of the substrate by performing thermal spraying on the thermal spray target surface of this substrate using the aforementioned thermal spray slurry. The thermal spraying using the aforementioned thermal spray slurry was performed using a plasma thermal spraying device, Model No. 100HE, produced by Progressive Surface Company. The thermal spraying condition was set as follows.

Flow rate of argon gas: 180 NL/min
Flow rate of nitrogen gas: 70 NL/min
Flow rate of hydrogen gas: 70 NL/min
Plasma output power: 105 kW
Thermal spraying distance: 76 mm
Traverse speed: 1500 mm/s
Thermal spraying angle: 90°
Slurry supply amount: 38 mL/min
Number of passes: 50 passes Then, the thermal sprayed coating formed on the thermal spray target surface of the substrate through the thermal spraying was evaluated. Specifically, an adhesion strength of the thermal sprayed coating to the thermal spray target surface of the substrate, a thermal spraying rate (coating formation rate), and a surface roughness Ra of the thermal sprayed coating were evaluated.

Here, a method of measuring the surface roughness (arithmetic mean roughness) Ra of the thermal sprayed coating will be described. The surface roughness Ra of the thermal sprayed coating was measured in accordance with the method prescribed in JIS B0601. Using a surface roughness meter, Model No. SV-3000S CNC, produced by Mitutoyo Corporation, the surface roughness Ra was measured at arbitrary five points on the surface of the thermal sprayed coating, and an average of the surface roughnesses Ra of the measured five points was set as the surface roughness Ra of the thermal sprayed coating. A reference line length and a cut-off value were set to 0.8 mm, respectively. The results are shown in Table 1.

The adhesion strength was measured using the following method. First, shot blasting was applied to a head portion of a hexagonal bolt whose thread portion has a nominal diameter of M10. For the blasting material, brown alumina, Model No. A-40, produced by Akiyama Sangyo Co., Ltd. was employed. Then, the head portion of the hexagonal bolt and the thermal sprayed coating formed on the thermal spray target surface of the substrate were adhered with an adhesive, and a tension test was performed by pulling the hexagonal bolt using a precision universal test machine, AUTOGRAPH, produced by Shimadzu Corporation. A strength at which peeling occurs at an interface between the thermal spray target surface of the substrate and the thermal sprayed coating, and the hexagonal bolt is separated from the substrate was set as the adhesion strength of the thermal sprayed coating. The measurement was performed four times, and an average value was taken as a measurement value. The results are shown in Table 1.

As recognized from the results of Table 1, in Examples 1 to 6, the ratio D10/Ra satisfies the requirement in which the ratio be larger than 0.4 and equal to or smaller than 0.9. Therefore, the adhesion strengths were better than those of Comparative Examples 1 to 4 in which the ratio does not satisfy the requirement. In particular, in Example 3, no peeling occurs at the interface between the thermal spray target surface of the substrate and the thermal sprayed coating for twice out of the four measurements, and peeling occurs at the interface (adhered surface) between the head portion of the hexagonal bolt and the thermal sprayed coating. Therefore, in Example 3, it is conceived that the actual adhesion strength is higher than the measurement value.

In Examples 1 and 4, the surface roughness Ra of the thermal spray target surface is equal to or lower than 1.1 μm. Therefore, the thermal spraying rate was particularly excellent.

The invention claimed is:

1. A method of forming a thermal sprayed coating on a thermal spray target surface of a substrate, comprising spraying, onto the thermal spray target surface, a thermal spray slurry containing thermal spray particles and a dispersion medium in which the thermal spray particles are dispersed, wherein a 50% particle diameter D50 of the thermal spray particles in volume-based cumulative particle diameter distribution is equal to or larger than 1 μm and equal to or smaller than 5 μm, and a ratio D10/Ra between a surface roughness Ra (unit: μm) of the thermal spray target surface and a 10% particle diameter D10 (unit: μm) of the thermal spray particles in the volume-based cumulative particle diameter distribution satisfies a formula "$0.4 < D10/Ra \leq 0.9$".

2. The method according to claim 1, wherein the surface roughness Ra of the thermal spray target surface is equal to or smaller than 1.1 μm.

3. The method according to claim 1, wherein the thermal spray slurry is sprayed after shot blasting is performed on the thermal spray target surface.

4. The method according to claim 1, wherein the thermal spray particles are metal oxide particles.

5. The method according to claim 4, wherein the metal oxide is yttrium oxide.

6. The method according to claim 2, wherein the thermal spray slurry is sprayed after shot blasting is performed on the thermal spray target surface.

7. The method according to claim 2, wherein the thermal spray particles are metal oxide particles.

8. The method according to claim 3, wherein the thermal spray particles are metal oxide particles.

9. The method according to claim 6, wherein the thermal spray particles are metal oxide particles.

10. The method according to claim 7, wherein the metal oxide is yttrium oxide.

11. The method according to claim 8, wherein the metal oxide is yttrium oxide.

12. The method of claim 1, wherein the thermal spray particles have the 50% particle diameter D50 equal to or larger than 2.5 μm and equal to or smaller than 5 μm in volume-based cumulative particle diameter distribution.

13. The method of claim 1, wherein the thermal spray particles have the 10% particle diameter D10 equal to or larger than 0.75 μm and equal to or smaller than 1.10 μm in volume-based cumulative particle diameter distribution.

* * * * *